United States Patent
Shin

(10) Patent No.: US 7,445,187 B2
(45) Date of Patent: Nov. 4, 2008

(54) WALL MOUNT FOR DISPLAY APPARATUS

(75) Inventor: Yong-Ha Shin, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 218 days.

(21) Appl. No.: 11/214,786

(22) Filed: Aug. 31, 2005

(65) Prior Publication Data

US 2006/0231711 A1    Oct. 19, 2006

(30) Foreign Application Priority Data

Mar. 8, 2005    (KR)    ............... 10-2005-0019353

(51) Int. Cl.
*B42F 13/00*    (2006.01)

(52) U.S. Cl. ............... 248/324; 248/325; 361/681

(58) Field of Classification Search ............... 248/328, 248/329, 330.1, 331, 332, 334.1, 323, 324, 248/325, 922, 923, 919, 292.13, 292.11, 248/284.1, 491, 125.2, 493; 361/681; 348/825; 312/247, 266, 325

See application file for complete search history.

(56) References Cited

U.S. PATENT DOCUMENTS

| | | | | |
|---|---|---|---|---|
| 3,586,324 A | * | 6/1971 | Bearson | 473/484 |
| 4,067,527 A | * | 1/1978 | Streit | 248/123.2 |
| 4,076,351 A | * | 2/1978 | Wyant | 312/247 |
| 5,058,846 A | * | 10/1991 | Close | 248/284.1 |
| 5,474,189 A | * | 12/1995 | Peterson | 211/18 |
| 6,484,993 B2 | * | 11/2002 | Huffman | 248/323 |
| 6,554,242 B2 | * | 4/2003 | Kim | 248/371 |
| 6,886,701 B2 | * | 5/2005 | Hong et al. | 211/99 |
| 6,964,399 B1 | * | 11/2005 | O'Neill | 248/292.13 |
| 7,175,146 B2 | * | 2/2007 | Kim | 248/279.1 |
| 2002/0179791 A1 | * | 12/2002 | Kwon | 248/284.1 |
| 2006/0065806 A1 | * | 3/2006 | Shin | 248/325 |

FOREIGN PATENT DOCUMENTS

| | | |
|---|---|---|
| JP | 8-174021 | 7/1996 |
| KR | 2000-11034 | 6/2000 |
| KR | 20-329506 | 10/2003 |
| KR | 2004-68634 | 8/2004 |

* cited by examiner

*Primary Examiner*—A. Joseph Wujciak, III
(74) *Attorney, Agent, or Firm*—Stanzione & Kim, LLP

(57) ABSTRACT

A wall mount to mount a display apparatus proximate a wall is disclosed. The wall mount may include a base to be attached to the wall; a supporting bracket supported by the base; a rotating bracket tiltably coupled with the supporting bracket, and on which the display apparatus is mounted; an elastic member coupled with the supporting bracket; and a supporting wire connected to the electric member and the rotating member. The elastic member may expand or contract relative to a movement of the rotating bracket. Thus the present invention provides simplifies the assembly and enhances the usability of the wall mount as well as provides an easily adjustable tilt angle of the wall mount.

18 Claims, 5 Drawing Sheets

WALL MOUNT FOR DISPLAY APPARATUS

CROSS-REFERENCE TO RELATED APPLICATIONS

This application claims the benefit of Korean Patent Application No. 2005-0019353, filed on Mar. 8, 2005, in the Korean Intellectual Property Office, the context of which is herein incorporated by reference in its entirety.

BACKGROUND OF THE INVENTION

1. Field of the Invention

The present invention relates to a wall mount for a display apparatus, and more particularly, to an improved wall mount having a tilting structure to tilt the display apparatus to a desired viewing angle.

2. Description of the Related Art

In today's consumer electronics market, many kinds of display apparatuses are used to visually display alphanumeric and/or pictorial images for viewing by a user. Recently, flat panel displays, such as plasma display panels (PDPs) or a liquid crystal displays (LCDs) have become widely used as televisions or computer monitors, and research and development of flat panel displays continues. The consumer demand for flat panel displays is increasing the demand for wall mount apparatuses (wall mounts) that occupy a small amount of space and can be installed in more places throughout home and business environments.

In a conventional wall mount, an angle adjusting member mounted between a supporting bracket and a rotating bracket is used to adjust the angle at which the display apparatus is tilted relative to a wall or other reference point. Illustrative examples of conventional wall mounts are provided by at least Korean Utility Model Application No. 20-1998-23535, Korean Patent Application No. 10-2003-5107, Korean Utility Model Application No. 20-2003-23146, and Japanese Patent First Publication No. 1998-174021, etc.

The assemblies comprising conventional wall mounts, however, tend to be complicated, and adjusting the tilt angle of the display apparatus can be difficult. Moreover, many angle adjusting members of conventional wall mounts are time-consuming and expensive to manufacture due to their large numbers of component parts.

SUMMARY OF THE INVENTION

An improved wall mount apparatus (wall mount) for supporting a display apparatus in an easily tiltable viewing position, and a simplified structural assembly for the wall mount's tilting mechanism are disclosed.

The improved wall mount may include a base to be attached to a wall, may further include a supporting bracket supported by the base, and may further include a rotating bracket tiltably coupled to the supporting bracket. A flat panel display apparatus may be mounted to the rotating bracket. An elastic member may be coupled with the supporting bracket. A supporting wire may be coupled with the electric member and the rotating member to expand or contract the elastic member as the rotating bracket moves between a first position adjacent the supporting bracket to a second position away from the supporting bracket.

An apparatus provided by the invention may include a supporting bracket having a length greater than its width, wherein the supporting bracket includes a first top surface substantially orthogonally coupled with a first sidewall and a second sidewall to define a channel. The supporting bracket may further include a flange substantially orthogonally coupled with at least the first sidewall or the second sidewall. Additionally, the first top surface may include a wire slot formed therein. The apparatus may further include a rotating bracket having a length greater than its width and rotatably coupled with the supporting bracket. The rotating bracket may include a second top surface substantially orthogonally coupled with a third sidewall and a fourth sidewall to define a second channel. The rotating bracket may further include a wire coupling part formed within the second channel, and the second channel may have a greater width than that of the first channel. The apparatus may further include a friction member having a first end movably coupled with the supporting bracket and a second end movably coupled with the rotating bracket. An elastic member, to counterbalance movement of the rotating member away from the supporting bracket and to assist movement of the rotating member toward the supporting bracket, may be positioned within the first channel. Additionally, a wire supporter may be positioned within the first channel away from the elastic member and proximate the wire slot. A supporting wire may have a first end coupled with the wire coupling part and a second end coupled with the elastic part, and a portion of the supporting wire may pass through the wire slot and about a portion of the wire supporter.

Various features of the invention are set forth in the following description. Additional may be apparent from accompanying drawings or may be learned by practicing the invention.

BRIEF DESCRIPTION OF THE DRAWINGS

The accompanying drawings, which are included to provide a further understanding of the invention and are incorporated in and constitute a part of this specification, illustrate embodiments of the invention. Together with the description, the drawings serve to explain the principles of the invention.

DETAILED DESCRIPTION OF THE INVENTION

Figure 1:
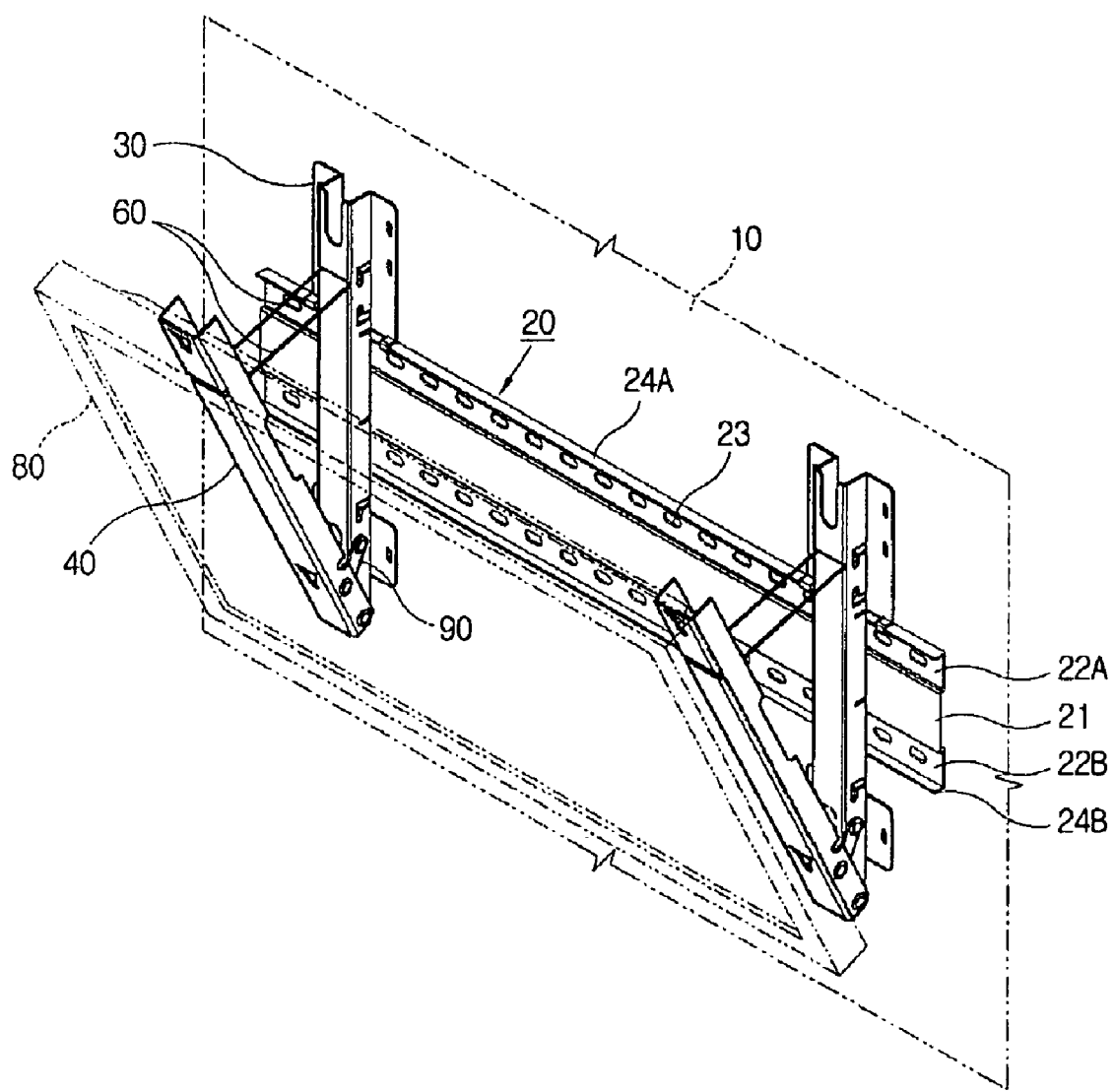
FIG. 1 is a perspective view of a wall mount manufactured according to the principles of the invention.

Descriptions of one or more embodiments of the invention are set forth below. Examples of these embodiments may be illustrated in the accompanying drawings, wherein like reference numerals may refer to like elements throughout. In describing the invention, reference is made to the accompanying drawings.

Figure 2:
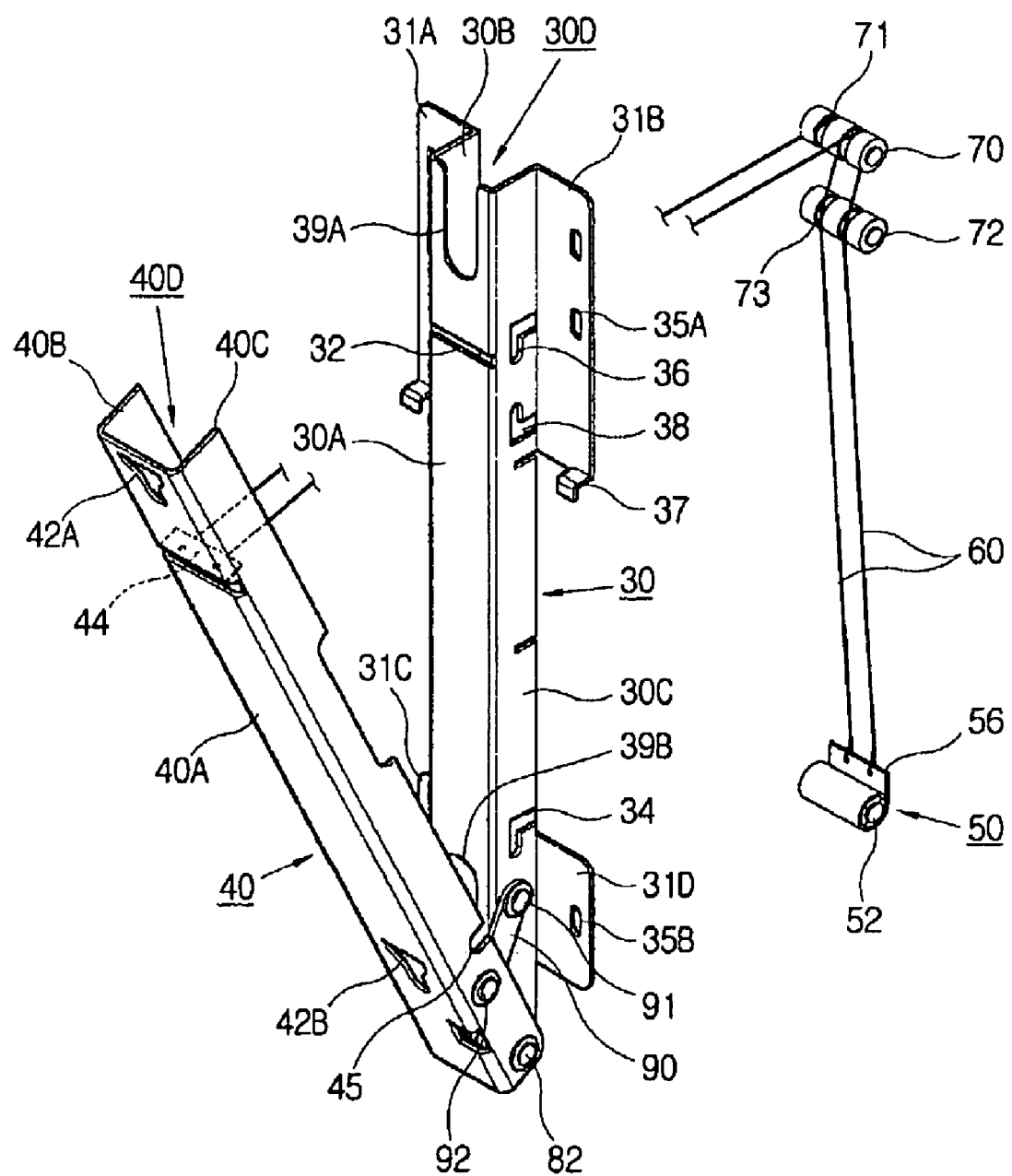
FIG. 2 is an exploded perspective view of a coupling structure of an elastic member and a supporting wire that may be components of FIG. 1.
Figure 3:
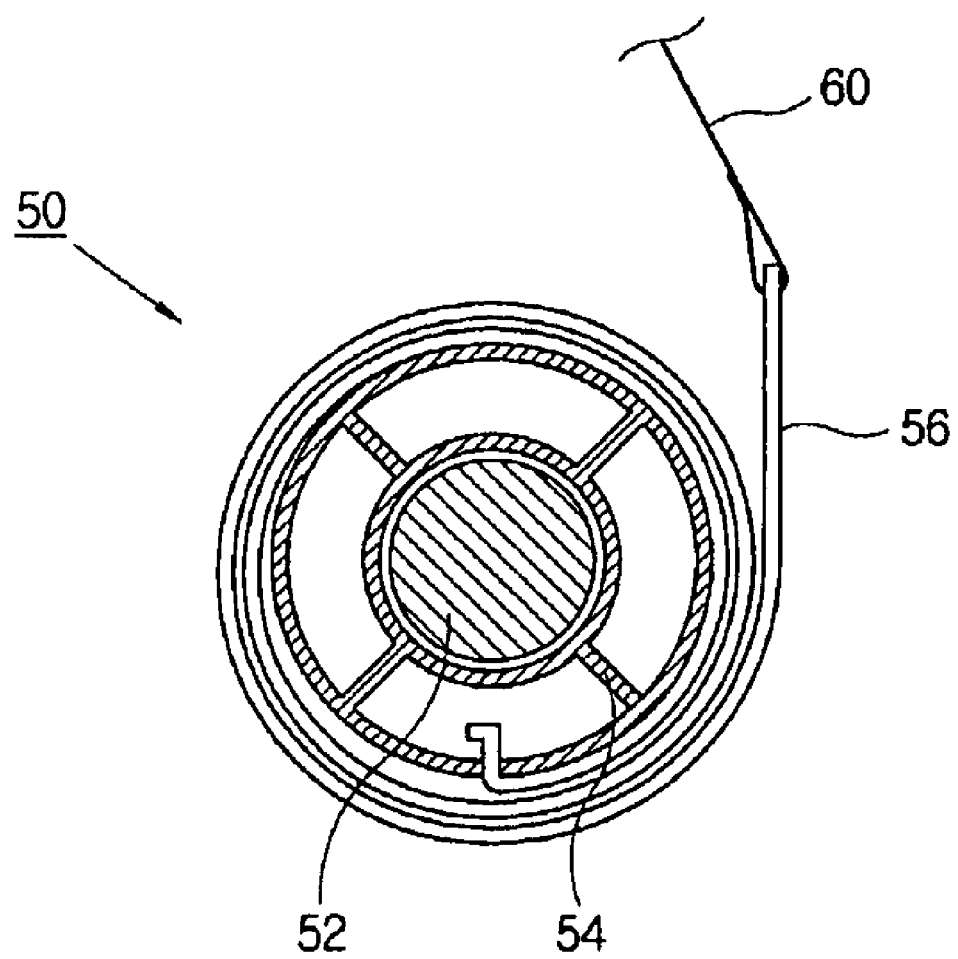
FIG. 3 is a sectional view of the elastic member of FIGS. 1 and 2.

Referring to FIGS. 1, 2, and 3, an improved wall mount apparatus (wall mount) for supporting a display apparatus may include a base 20, a supporting bracket 30, a rotating bracket 40, an elastic member 50, and a supporting wire 60. The base 20 may have a uni-body or multi-component construction, and may be formed of a rigid material, including, but not limited to metal, a polymeric compound, plastic, etc. The base 20 may have a length greater than its width, and its two side surfaces may be longer than its two ends. More particularly, the base 20 may include a substantially flat center panel 21 longitudinally disposed about the base's longitudinal central axis. Recessed flanges 22A and 22B may extend laterally on either side of the center panel 21. Each flange may include one or more openings 23 to reduce weight and/or to facilitate fastening the base 20 to a support surface. The outer edge of flange 22A may include a raised lip 24A, and the outer edge of the flange 22B may include a raised lip 24B. Each of the raised lips 24A and 24B may extend substantially vertically upwards from its parent flange 22A or 22B. The top edge of each flange 22A and 22B may be approximately level with a top surface of the center panel 21, which may be raised a predetermined distance above a top surface of each flange 22A and 22B. In such a configuration, the space between one side of the center panel 21 and the raised lip 24A forms a first channel, and the space between the other side of the center panel 21 and the other raised lip 24B forms a second channel. As explained in further detail below, the base 20 functions at least to support the supporting bracket (s) 30 and or the rotating bracket(s) 40. Of course, the embodiment described above and illustrated in FIG. 1 is merely exemplary, and the invention may also include a base 20 having other geometric shapes and/or structures.

Referring to FIGS. 1 and 2, the invention further includes at least one, but preferably two, supporting bracket(s) 30. Each supporting bracket 30 has a length longer than its width, and its two sides are longer than its ends. Additionally, each supporting bracket 30 includes a substantially planar top surface 30A, sidewalls 30B and 30C, cutouts 39A and 39B, and flanges 31A, 31B, 31C, and 31D.

The planar top surface 30A is longitudinally disposed along the supporting bracket's longitudinal center axis. A first U-shaped cutout 39A is formed in a top end of the top surface 30A, and a second U-shaped cutout 39B is formed in a bottom end of the planar top surface 30A. The base of cutout 39A forms a first gap in the top end of the top surface 30A, and the cutout's opposite end may be square or radiused. Similarly, the base of cutout 39B forms a second gap in the bottom end of the top surface 30A, and the cutout's opposite end may be square or radiused. Additionally, the top surface 30A includes a wire slot 32 formed a predetermined distance below the square or radiused end of cutout 39A. The wire slot 32 substantially traverses the width of the top surface 30A, and has a width slightly larger than a diameter of a supporting wire 60. The interior edges of the slot 32 may be blunted or covered with an anti-chafing material.

Opposing sidewalls 30B and 30C extend substantially orthogonally below a horizontal plane passing through the top surface 30A, and may be seamlessly attached to the top surface 30A along an entire length thereof.

At a predetermined distance proximate the square or radiused end of the cutout 39B, a first P-shaped or L-shaped supporting hole 34 may be formed in each of the opposing sidewalls 30B and 30C. The long portion of the supporting hole 34 may terminate at one end in a gap formed in an edge of its parent sidewall 30B or 30C, and terminate at the other end in a substantially orthogonal short portion that extends toward the bottom end of the bracket 30.

At a predetermined distance between the square or radiused end of the cutout 39A and the wire slot 32, a second P-shaped or L-shaped supporting hole 36 may be formed in each of the opposing sidewalls 30B and 30C. The long portion of the supporting hole 36 may terminate at one end in a gap formed in an edge of its parent sidewall 30B or 30C, and terminate at the other end in a substantially orthogonal short portion that extends toward the bottom end of the bracket 30.

At a predetermined distance proximate the short portion of the second cutout 36, a third P-shaped or L-shaped supporting hole 38 may be formed in each of the opposing sidewalls 30B and 30C. The long portion of the supporting hole 38 may terminate at one end in a gap formed in an edge of its parent sidewall 30B or 30C, and may terminate at the other end in a substantially orthogonal short portion that extends toward the top end of the bracket 30.

Flanges 31A and 31B may extend downward a predetermined distance from the top end of the bracket 30, and extend substantially orthogonally outward from each of their parent sidewalls 30B and 30C. Each flange 31A and 31B may include one or more openings 35A through which a fastening means, including, but not limited to, a bolt, may be inserted. Additionally, the bottom edge of each flange 31A and 31B may include a clip (i.e. fastener) 37. The clip(s) 37 may be L-shaped. The long portion of the clip may extend substantially orthogonally upwards from a top surface of its parent flange 31A or 31B. As illustrated in FIG. 1, the clips 37 may engage the raised lip 24A of the base 20. Of course, clips 37 having other geometric shapes and/or structures may also be used.

Flanges 31C and 31D extend substantially orthogonally outward from each of their parent sidewalls 30B and 30C. Each flange 31C and 31D may be each positioned between the first supporting hole 34 and the bottom end of the bracket 30. Each flange 31C and 31D may include one or more openings 35B through which a fastening means, including, but not limited to, a bolt, may be inserted. As shown in FIG. 1, the flanges 31C and 31D may be positioned a predetermined distance below the raised lip 24B of the base 20. In other embodiments, the flanges 31C and 31D may be connected with (one or more) base(s) 20.

Each supporting bracket 30 may further include first hinge member(s) 82 and second hinge member(s) 91. Each first hinge member 81 and each second hinge member are connected with their respective parent sidewalls 30C and 30D. More specifically, each first hinge member 82 is positioned on sidewall 30B or 30C proximate the bottom end of the bracket 30. Each second hinge member 91 is positioned on each sidewall 30B or 30C between each first supporting hole 34 and each first hinge member 81. The first hinge member(s) rotatably connect the bottom end(s) of bracket(s) 30 to the bottom end(s) of the rotating bracket(s) 40. The second hinge member(s) 91 rotatably and/or slidably connect to first end(s) of friction member(s) 90 that further link the supporting bracket(s) 30 with rotatable bracket(s) 40. Referring briefly to FIG. 4, each second hinge member 91 may slidably fit within a slot 93 formed in the corresponding sidewall 30B or 30C. Referring again to FIGS. 1 and 2, the other end(s) of the friction member(s) 90 may rotatably connect with third hinge member(s) 92 that rotatably connect with the sidewalls 40B and 40C of the rotating bracket(s) 40.

The friction member 90 may be a mechanical linkage that supplies a friction force to control the tilt angle during rotation of the rotating bracket 40 (further discussed below) so that the rotating bracket 40 is maintained in a desired tilted state although a sustained gravitational force is applied after the rotating bracket 40 occupies the desired tilt angle. Of course, other types and/or positions of friction members 90 may be used, depending on the amount of frictional force required to counteract the weight of individual masses of different flat panel displays.

The following paragraphs reference the supporting holes 34, 36, and 38, discussed above, that are formed in each of the supporting bracket(s) 30. Referring to FIGS. 1 and 2, the first supporting hole 34 supports a shaft 52 of an elastic member 50. Additionally, the second supporting hole 36 supports a shaft of a first grooved, cylindrical wire supporter 70. Similarly, the third supporting hole 38 supports a shaft of a second (auxiliary) grooved, cylindrical wire supporter 72.

Each of the wire supporters 70 and 72 may be formed of a rigid material including, but not limited to, metal, plastic, a polymeric compound, etc. The first wire supporter 70 includes spaced-apart, circumferential grooves 71 to receive a supporting wire 60 therein. Similarly, the second (auxiliary) wire supporter 72 includes spaced-apart, circumferential grooves 72 to receive a supporting wire therein. The first and second wire supporters 70 and 72 rotate as the supporting wire(s) 60 move against them when the rotating bracket(s) 40 are tilted to a desired viewing position. The wire supporters 70 and 72 may be provided to prevent the supporting wire(s) 60 from chafing (and/or fraying) against the edges of the wire slot 32.

Figure 4A:
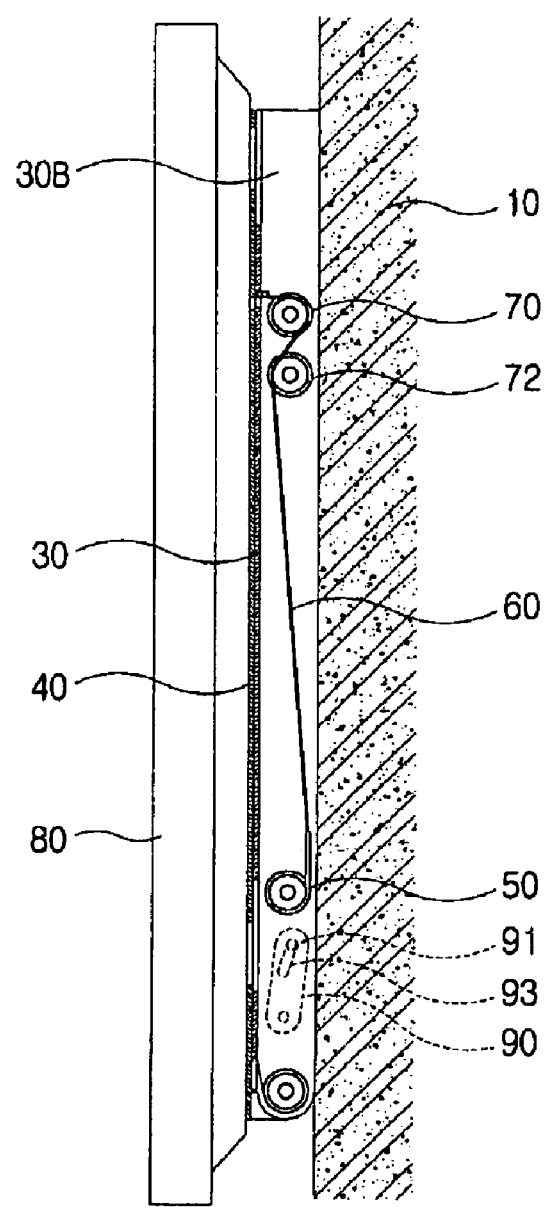
FIGS. 4A and 4B illustrate an operation of a wall mount manufactured according to the principles of the invention.

Referring briefly to FIG. 4A, the supporting wires 60 may pass over top of and around the right side of the first wire supporter 70, and then around the left side of the second wire supporter 72 before angling downward to connect with a spring 56. Thus, the wire supporters 70 and 72 each support a separate part of the supporting wires 60 and thereby maintain a predetermined tension state of the supporting wires 60. The supporting wire(s) 60 should be made of a strong material that may include, but is not limited to, piano wire.

Referring briefly to FIG. 3, the wires 60 may be mounted in parallel to the spring 56 wound about a roller 54 connected to a cylindrical shaft 52. As mentioned above, the shaft 52 may be positioned within the first supporting holes 34 formed in the supporting bracket 30.

The spring 56 and the shaft 52 may be components of the elastic member 50. The spring 56 may be a leaf spring shaped like a plate. Because flat panel displays of different masses will require different amounts of counterbalancing force, the spring's tensile strength may be adjusted as desired by using different materials and/or by varying the spring's width/thickness. Particular values of spring constants and/or tensile strengths are not listed here because they will vary depending on at least the weight of each particular flat panel display apparatus 80 (and/or other factors such as the friction provide by the friction member 90). Moreover, such values should prove easy for a skilled artisan to calculate or otherwise determine without undue experimentation.

Referring again to FIGS. 1 and 2, the invention further includes a number of rotating brackets 40 that equals the number of supporting brackets 30. Each rotating bracket 40 has a length greater than its width, and its two sides are longer than its ends. Additionally, each rotating bracket 40 includes a substantially planar top surface 40A, sidewalls 40B and 40C, mounting apertures 42A and 42B, and a coupling part 44. Each bracket 40 is made of a rigid material, including, but not limited to, metal, plastic, a polymeric compound, etc.

The top surface 40A is longitudinally positioned along the bracket's longitudinal center axis. A first mounting aperture 42A may be formed in the top surface 40A at a top end thereof, and a second mounting aperture 42B may be formed in the top surface 40A at a bottom end thereof. Each mounting aperture 42A and 42B may have a top portion that is wider than a bottom portion. Additionally, each mounting aperture may function to receive and/or secure a fastening means connected with a display apparatus. The fastening means may include, but is not limited to a pin, bolt, tab, clip, etc. In particular, the wide top portion of each aperture may first receive the fastening means, which then moves downward to slidably engage the aperture's narrow bottom portion.

Opposing sidewalls 40B and 40C, one per side of the top surface 40A, extend substantially orthogonally below a horizontal plane paralleling the top surface. Each sidewall 40B and 40C may seamlessly connect with the top surface 40A along an entire length thereof.

As mentioned above, the bottom end of each rotating bracket 40 includes the first hinge member 82, as well as the third hinge member 92, which is positioned a predetermined distance above the first hinge member 82. One end of a mechanical link (friction member 90) may movably connect with third hinge member 92, and the other end of the friction member 90 may movably connect with the second hinge member 91.

A U-shaped recess 45 may be formed in each of the sidewalls 40B and 40C. A bottom portion of each recess 45 may include a gap formed in the edge of the recess' parent sidewall 40B or 40C. A top portion of each recess 45 may be radiused. Each recess 45 is sized and positioned to fit over and/or about the second hinge member 91 that is slidably connected with the lower portion of each supporting bracket 30. Use of recesses 45 enables the rotating bracket 40 to occupy a first closed position, in which the top surface 40A of the rotating bracket 40 substantially parallels the top surface 30A of the supporting bracket 30, and the sidewalls 40B and 40C of the rotating bracket 40 overlap (and/or substantially parallel) the sidewalls 30B and 30C of the supporting bracket 30.

Additionally, a coupling part 44 may be fixedly connected with the underside of top portion of the rotating bracket 40. More particularly, the coupling part 44 may be fixedly positioned within the channel 40D, which is defined as the area bounded by sidewalls 40B and 40C and the top surface 40A. Additionally, the coupling part 44 may be positioned on the underside of the top surface 40A at a predetermined distance below the bottom portion of the first aperture 42A. Referring to FIG. 1, the coupling part 44 may further be positioned such that it fits within the wire slot 32 formed on the supporting bracket 30 when the rotating bracket 40 occupies its first closed position (FIG. 4A). The wires 60 are coupled at their first ends to the coupling part 44, and at their second ends to the spring 56. Additionally, an upper portion of the wires 60 passes through the wire slot 32 as the rotating bracket 40 is moved from its first closed position to a second open position (FIG. 4B) and back again.

Figure 4B:
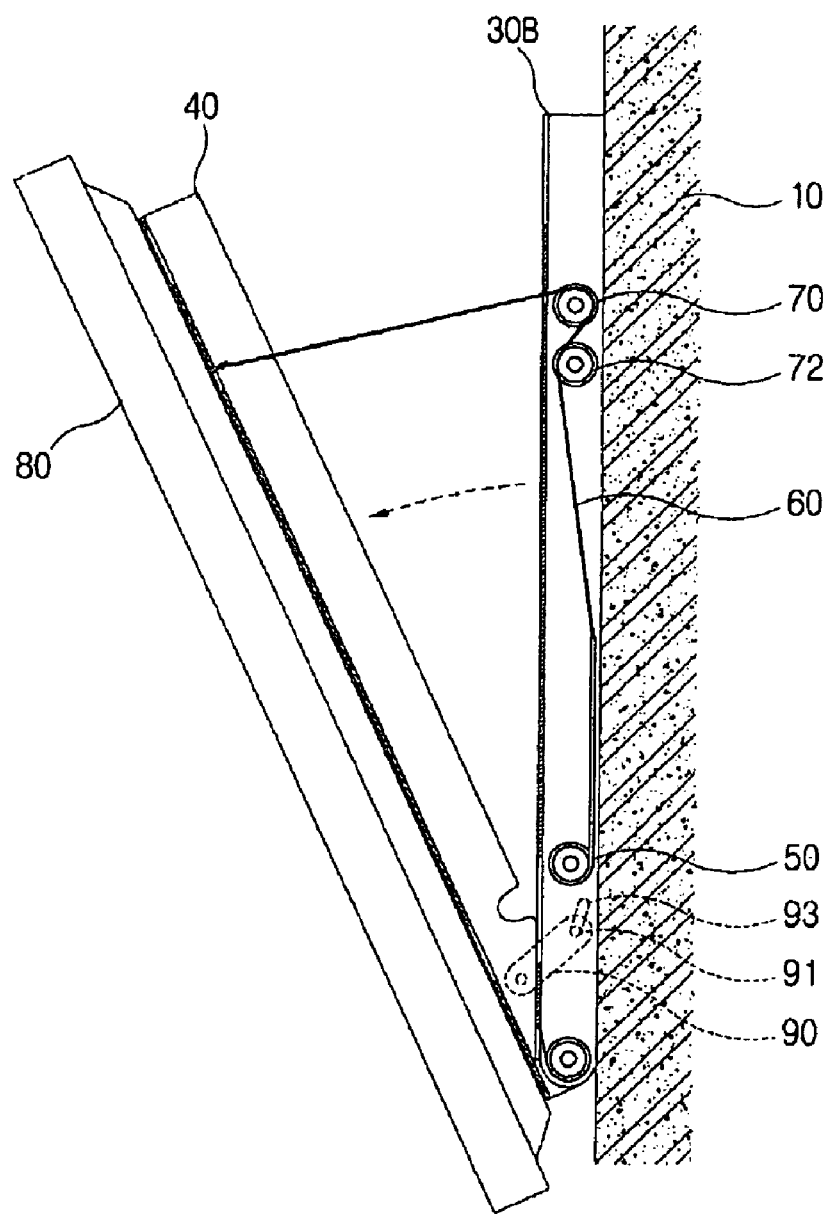

FIGS. 4A and 4B illustrate side views of the wall mount of FIGS. 1, 2, and 3. More particularly, FIG. 4A depicts the wall mount in a first closed position, while FIG. 4B depicts the wall mount in a second open position (i.e., tilted to a desired viewing angle relative to the vertical). FIGS. 4A and 4B each show the flat panel display apparatus 80 coupled to rotating brackets 40. Each figure further includes a cut-away view of the supporting bracket(s) 30. Specifically, the sidewall 30C that was shown in FIGS. 1 and 2 has been removed to illustrate the positioning of first wire supporter 70, second wire supporter 72, elastic member 50, friction member 90 and slot 92. Additionally, the base 20 and flanges 31B and 31D have been omitted so as not to complicate the depiction of the invention unnecessarily.

From both FIGS. 4A and 4B, it can be seen that the first wire supporter 70, second wire supporter 72, and the elastic member 50 may be positioned within a channel defined by sidewall 30B, sidewall 30C, and top surface 30A of each supporting bracket 30.

Comparing FIGS. 4A and 4B, it is seen that the position of hinge member 91 may traverse a length of the slot 93 as the rotating bracket(s) 40 (and removably attached flat panel display) are rotated between the first closed position (FIG. 4A) to the second open position (FIG. 4B).

Exemplary methods of manufacturing, assembling, installing, and operating a wall mount manufactured in accordance with the principles of the invention are now described with reference to FIGS. 1, 2, 3, 4A, and 4B. The steps described may be performed in any suitable order, and the invention is not limited merely to the order of steps described below.

As mentioned above, the base 20, the bracket assemblies 30/40 and their component parts are manufactured of a rigid material, such as, but not limited to metal, using known manufacturing techniques, that may include, but are not limited to, die-stamping, welding, molding, etc. In particular, at least the base 20, supporting bracket(s) 30, and the rotating bracket(s) 40, first wire supporter 70, second wire supporter 72, supporting wires 60, elastic member 50, friction member(s) 90, and hinge members 82, 91, and 92 may be manufactured separately as independent components and then assembled.

For example, the bottom portion of rotating bracket 40 may be positioned (in the open position shown in FIG. 2) to overlap the bottom portion of the bracket 30, and movably secured thereto using hinge member 82. The friction member 90 may then be movably secured at one end to the rotating bracket 40 using hinge member 92, and movably secured at the other end to the supporting bracket 30 using hinge member 91.

The shaft of first wire supporter 70 may be inserted into the open end(s) of the supporting hole(s) 36 and moved to engage the holes' short transverse portion(s). The shaft of second wire supporter 72 may similarly be connected with the supporting hole(s) 38, and the shaft of elastic member 50 may similarly be connected with the supporting hole(s) 34.

Portions of the supporting wires 60 may be fitted within the grooves 73 of the second wire supporter 73, on the side thereof adjacent the top surface 30A of bracket 30. Other portions of the supporting wires 60 may be fitted within the grooves 71 of the first wire supporter 70, on the side thereof opposite the top surface 30A of the bracket 30, and passed through the wire slot 32. Thereafter, the first ends of the wires 60 may be (fixedly or adjustably) secured to the coupling part 44. With the rotating bracket 40 rotated to the closed position shown in FIG. 4A, the supporting wires 60 are suitably tensioned, and their second ends are (fixedly or adjustably) attached the spring 56.

An exemplary method of installation is now described. For example, the base 20 is positioned on a vertical support surface, such as a wall 10, such that the base's longitudinal center axis substantially parallels the horizontal. The base 20 is then fastened to the support surface by inserting a fastener through an opening 23 formed in flanges 22A and/or 22B and manipulating the fastener until the base 20 is firmly coupled to the support surface 10.

Next, each bracket assembly (i.e. assembled rotating bracket 40, supporting bracket 30, supporting wires 60, wire supporters 70 and 72, and elastic member 50) may be connected to the base 20 and firmly fastened to the support surface 10. More particularly, a first supporting bracket 30 (left bracket 30 in FIG. 1, for example) is positioned such that the clip(s) 37 of its top flanges 31a and 31B engage the raised rib 24A of the base's flange 22A. After aligning the longitudinal axis of the supporting bracket 30 with the vertical, a fastener may be inserted through an opening 35 in a flange 31A, 31B, 31C, and 31D, and manipulated until the supporting bracket 30 is firmly coupled to the support surface 10. The remaining supporting bracket 20 (right supporting bracket 20 in FIG. 1, for example) may be similarly connected with the base 20 and the support surface 10, and may be spaced apart from the first bracket assembly at a distance that corresponds to the width of the hanging fasteners (not shown) attached to the rear of the flat panel display apparatus 80.

The flat panel display apparatus 80 may be positioned such that its hanging fasteners project through the upper portions of the mounting apertures 42A and 42B formed in each rotating bracket 40, and then moved downward until each of the display's hanging fasteners slidably engage the narrow bottom portions of each of the mounting apertures 42A and 42B.

In use, a user may grasp the top (or side) of the flat panel display apparatus 80 and apply an external force sufficient to overcome both the frictional force supplied by the friction member(s) 90 and the tensile force supplied by the spring 56 and supporting wires 60. The applied external force causes the display apparatus 80 (and coupled rotating hinges 40) to rotate between the first closed position of FIG. 4A and the second open position of FIG. 4B. As the top portion of the display apparatus 80 moves away from the support surface 10, the supporting wires 60 coupled to the rotating brackets 40 pull the spring 56 and unroll it from its contracted state. (Movement of the top portion of the display apparatus toward the support surface 10, is assisted by contraction of the spring 56.) In this manner, rotational movement away from the support surface 10 may be dampened (slowed) by the extension of spring 56. Similarly, rotational movement toward the support surface 10 may be assisted by the contraction of the spring 56 (and may be dampened by the friction member 90).

At any point between the first closed position and the second open position, the user may release the display apparatus 80, and the desired viewing angle will be maintained until another external force is applied. More particularly, the display panel apparatus 80 becomes secured in a suspended state by a combination of at least the display panel apparatus' weight, the tensile strength of each spring 56, and the frictional force provided by each friction member 90.

In one embodiment of the invention, use of the base 20 may be optional.

As described above, a wall mount apparatus manufactured according to the principles of the present invention may simplify an assembly process and enhance a usability of the wall mount apparatus by making a portion of the wall mount apparatus easily tiltable to a desired viewing angle.

Further, a wall mount apparatus manufactured according to the principles of the invention may have fewer components than conventional wall mounts, and consequently, a lower cost of manufacture and/or assembly. Use of supporting wire(s) and an elastic member may further enhance the wall mount apparatus provided by the invention.

It will be apparent to those skilled in the art that various modifications and variation can be made in the invention without departing from the spirit or scope of the invention. Thus it is intended that the invention cover the modifications and variations of this invention provided they come within the scope of the appended claims and their equivalents.

What is claimed is:

1. A wall mount configured to mount a display apparatus proximate a wall, the wall mount comprising:
   a base to be coupled with the wall;
   a supporting bracket configured to supportably engage the base and to be coupled with the wall;
   a rotating bracket tiltably coupled to the supporting bracket, and whereby the display apparatus is coupled to the rotating bracket;
   an elastic member, comprising:
      a shaft coupled with the supporting bracket,
      a roller rotatably coupled with the shaft, and
      a spring wound around the roller; and
   a supporting wire coupled at one end to the spring of the elastic member and couple at another end to the rotating bracket,
   wherein the elastic member expands or contracts relative to a movement of the rotating bracket to tilt the display apparatus to a desired viewing angle.

2. The wall mount of claim 1, wherein the spring comprises a leaf spring.

3. The wall mount of claim 1, further comprising a friction member coupled with the supporting bracket and coupled with the rotating bracket to supply a frictional force to the rotating bracket and to maintain the rotating bracket at a desired viewing angle.

4. The wall mount of claim 1, further comprising a wire supporter coupled with the supporting bracket, and rotatably supporting the supporting wire.

5. The wall mount of claim 4, wherein, the wire supporter comprises a circumferential groove to accomodate the supporting wire.

6. An apparatus, comprising:
- a supporting bracket having a length greater than its width, wherein the supporting bracket comprises a first top surface substantially orthogonally coupled with a first sidewall and a second sidewall to define a first channel, and further comprises a flange substantially orthogonally coupled with at least the first sidewall or the second sidewall, wherein the first top surface includes a wire slot formed therein;
- a rotating bracket having a length greater than its width and rotatably coupled with the supporting bracket, wherein the rotating bracket comprises a second top surface substantially orthogonally coupled with a third sidewall and a fourth sidewall to define a second channel, and further comprises a wire coupling part formed within the second channel, wherein the second channel has greater width than that of the first channel;
- an elastic member to counterbalance movement of the rotating bracket away from the supporting bracket and to assist movement of the rotating bracket toward the supporting bracket, wherein the elastic member is positioned within the first channel;
- a wire supporter positioned within the first channel away from the elastic member and proximate the wire slot; and
- a supporting wire having a first end coupled with the wire coupling part and a second end coupled with the elastic member, wherein a portion of the supporting wire passes through the wire slot and about a portion of the wire supporter.

7. The apparatus of claim 6, further comprising: a base bracket to supportably engage the supporting bracket, wherein the base bracket comprises a third top surface disposed above a first longitudinal flange and a second longitudinal flange, each of which substantially parallels a longitudinal axis of the base bracket.

8. The apparatus of claim 7, wherein the first longitudinal flange further comprises a first raised lip extending along at least a portion of a length thereof, and wherein the first raised lip is configured to supportably engage a bottom portion of the supporting bracket flange.

9. The apparatus of claim 7, further comprising a flat panel display apparatus coupled with the rotating bracket.

10. The apparatus of claim 9, wherein the supporting bracket flange includes a fastener configured to couple the flange with a support surface.

11. The apparatus of claim 9, wherein the base bracket includes a fastener configured to couple the base bracket with a support surface.

12. The apparatus of claim 6 wherein the wire supporter comprises a circumferential groove formed in an outer surface thereof and the supporting wire fits within a portion of the circumferential groove.

13. The apparatus of claim 6, wherein a base end of the rotating bracket is movably coupled to a base end of the supporting bracket.

14. The apparatus of claim 6, wherein the supporting bracket first top surface, the first sidewall, and the second sidewall fit within the second channel formed by the rotating bracket when the rotating bracket is in a first closed position.

15. The apparatus of claim 14, wherein the wire coupling part projects through the wire slot when the rotating bracket is in the first closed position.

16. The apparatus of claim 6, wherein the rotating bracket is movable between a first position adjacent the supporting bracket to a second position away from the supporting bracket.

17. The apparatus of claim 6, wherein the elastic member comprises a shaft coupled with the supporting bracket, a roller rotatably coupled with the shaft, and a spring wound around the roller and coupled with the supporting wire.

18. An apparatus of claim 6, further comprising a friction member having a first end movably coupled with the supporting bracket and a second end movably coupled with the rotating bracket.

* * * * *